(12) United States Patent
Kiukkonen et al.

(10) Patent No.: US 7,155,216 B2
(45) Date of Patent: Dec. 26, 2006

(54) FUNCTIONALITY TEST IN A BASE TRANSCEIVER STATION

(75) Inventors: Niko Kiukkonen, Veikkola (FI); Jari Junell, Vantaa (FI)

(73) Assignee: Nokia Corporation, Espoo (FI)

( * ) Notice: Subject to any disclaimer, the term of this patent is extended or adjusted under 35 U.S.C. 154(b) by 481 days.

(21) Appl. No.: 10/246,748

(22) Filed: Sep. 19, 2002

(65) Prior Publication Data

US 2004/0203466 A1 Oct. 14, 2004

(51) Int. Cl.
   *H04Q 7/20* (2006.01)
(52) U.S. Cl. ............... 455/423; 455/424; 455/425; 455/67.1; 455/67.14
(58) Field of Classification Search ......... 455/423, 455/424, 425, 67.11, 67.14
   See application file for complete search history.

(56) References Cited

U.S. PATENT DOCUMENTS

| | | | |
|---|---|---|---|
| 5,294,934 A * | 3/1994 | Matsumoto | 342/173 |
| 5,572,510 A | 11/1996 | Koivu | |
| 5,640,728 A * | 6/1997 | Graebe | 5/606 |
| 6,741,640 B1 * | 5/2004 | Johnson | 375/219 |
| 6,834,078 B1 * | 12/2004 | Niemela et al. | 375/224 |
| 2002/0042894 A1 * | 4/2002 | Henriksson | 714/25 |

\* cited by examiner

*Primary Examiner*—Matthew Anderson
*Assistant Examiner*—Minh Dao
(74) *Attorney, Agent, or Firm*—Pillsbury Winthrop Shaw Pittman LLP

(57) ABSTRACT

A base station in a radio system includes a transmitter that forms a signal to be transmitted by a transmission antenna of the base station, a mechanism forming a portion of the signal to be transmitted in a transmission frequency, a mechanism shifting the formed signal portion into a receiving frequency, where the separation between the receiving frequency and the transmission frequency differs from a frequency duplex used in the radio system, and a mechanism receiving the frequency-shifted signal portion.

35 Claims, 5 Drawing Sheets

FUNCTIONALITY TEST IN A BASE TRANSCEIVER STATION

FIELD

Figure 1A:
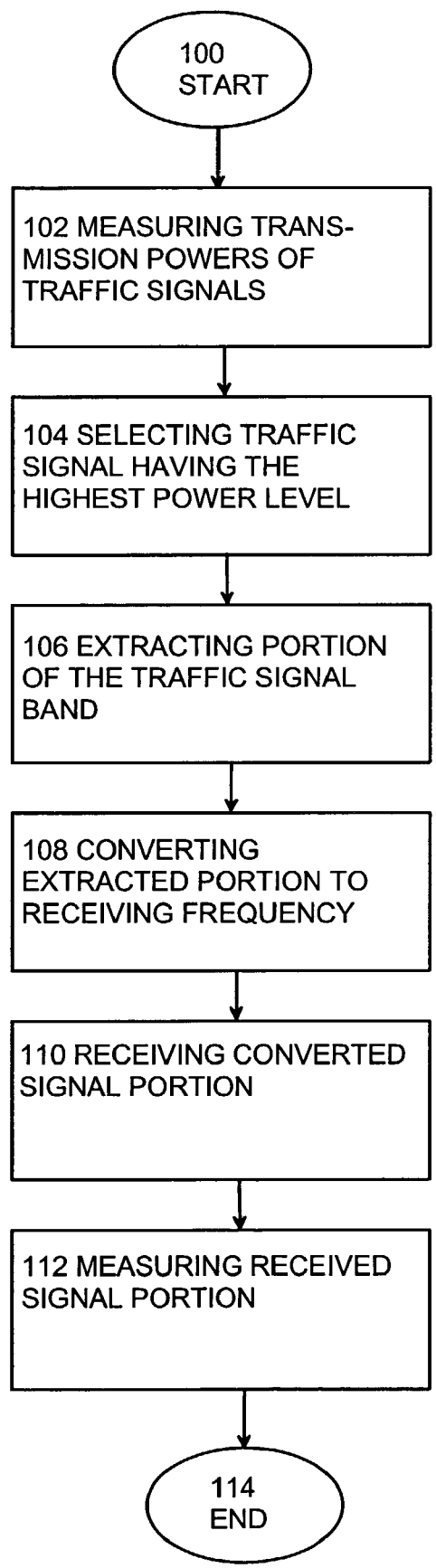

This invention relates to a method and an arrangement for performing a functionality test in a base station of a radio system.

BACKGROUND

In a radio network system, operability is maintained by performing various tests on the network elements. Naturally one of the most critical objects for testing is a base transceiver station (BTS) realizing the radio link towards a mobile terminal. Although testing is of utmost importance, likewise it is important that the performed tests do not disturb the normal operation and traffic carried out by the base station.

One type of functionality test is a so-called loop-test, where a signal portion is transported from the transmission equipment to the receiving equipment in a base station. In one prior art solution, U.S. Pat. No. 5,572,510, relating to the GSM (Global System for Mobile Communication) radio system, the transmission and receiving frequencies in the loop-test are situated a frequency division duplex (FDD) apart from each other.

In the prior art solutions, functionality tests, such as the loop test, have been performed during low traffic time in order to ensure the availability of resources. In the GSM system, the measurements are limited to idle time slots in the channel structure. The need for resources is emphasized by the fact that when performing a test, corresponding resources are needed in the uplink and in the downlink. In the GSM system, corresponding resources mean that the uplink and downlink resources are separated from each other by three timeslots. Therefore tests can in practice only last a few milliseconds at a time and continuous testing, for instance, is not possible.

BRIEF DESCRIPTION

It is an object of the invention to provide a solution that enables performing a functionality test in a base station at any time needed or even continuously without the need to limit the testing to times of low-traffic. This is achieved by a functionality test method in a base station of a radio system, the method comprising forming, in the transmitter of a base station, a test signal portion in at least one transmission frequencies, shifting the formed test signal portion into at least one receiving frequency, where the separation between the receiving frequency and the transmission frequency differs from the frequency duplex used in the radio system, and transporting the frequency shifted test signal portion to a receiver of the base station.

The invention also relates to a base station in a radio system, comprising at least one transmitter for forming a signal to be transmitted by a transmission antenna of the base station, means for forming a test signal portion of at least one signals formed by the at least one transmitter to be transmitted in a transmission frequency, means for shifting the formed test signal portion into at least one receiving frequency, where the separation between the receiving frequency and the transmission frequency differs from a frequency duplex used in the radio system, and means for receiving the frequency-shifted test signal portion.

Some embodiments of the invention are described in the dependent claims, specification and drawings.

The invention relates to a functionality test performed in a base station of a radio network. The invention can be implemented in a multi-carrier base station, that is, a base station which is able to transmit and receive several carrier waves simultaneously. In a multi-carrier system according to the invention, the carrier waves do not use the whole bandwidth available in the system, but instead are bandwidth limited and separated from each other. For instance, in the GSM system, where radio transmission is done over carrier waves being placed 200 kHz apart from each other, the multi-carrier nature can be implemented.

The goal in a functionality test is to test the operation of a transmitter and/or a receiver in the base station. The test can be directed to the whole transmitter/receiver system, or it can be directed to different equipment units in a transmitter/receiver. In this description, the functionality test defines a test where a signal portion is transported from the transmitter to the receiver within a base station of a radio system.

In the invention, the receiving channel and transmission channel used in the functionality test have a separation that differs from the duplex between the frequency bands used for transmission and reception. For instance, in the GSM system, the uplink transmission occurs on the frequency band 890 to 915 MHz and the downlink transmission is placed on the frequency band 935 to 960 MHz. The difference or the frequency duplex between these bands is then 45 MHz. In the functionality test of the invention, the frequency duplex between the transmission and reception frequencies differs from this 45 MHz and can be for example 44.8 MHz.

In one embodiment of the invention, the signal portion used for the functionality test is extracted from a traffic signal. This provides the advantage that no separate means for generating test signals are needed in the base station. The use of a traffic signal also causes no extra disturbance in the transmission, because the signal is a signal to be transmitted by the base station in any case. In a multi-carrier GSM base station, where traffic channels in one cell are usually placed 600 kHz apart from each other, there are two channels between the traffic channels in the receiving end where the reception of the functionality test signal can be placed.

In one embodiment of the invention, more than one traffic signal is monitored and power levels are measured from them. The traffic signal having the highest power level is selected for functionality test purposes. When using the most powerful signal for the functionality test, it is known that there are no other signals that might cause more disturbance to the system than the chosen test signal. This is based on the power control mechanism of the mobile communications system; a high transmitting power indicates that the mobile terminal is located far away from the base station, which leads to a low level of the receiving power. Then, for instance in the case of the GSM system, it can be ensured in the receiver that the power level difference of +9 dB set for the neighbouring channels in the GSM standards is not exceeded. If this or a corresponding power level difference was exceeded, the bit-error-rate in the weaker channel would get worse.

The method and system of the invention provide several advantages in a multi-carrier base station. The base station can be tested under normal traffic operation leading to improved operability since malfunctions can be noticed much earlier than in tests that are performed only occasionally. Additionally, when the reception of a functionality test signal is moved to a channel not having traffic, disturbances caused by testing are substantially diminished.

DRAWINGS

Figure 1B:
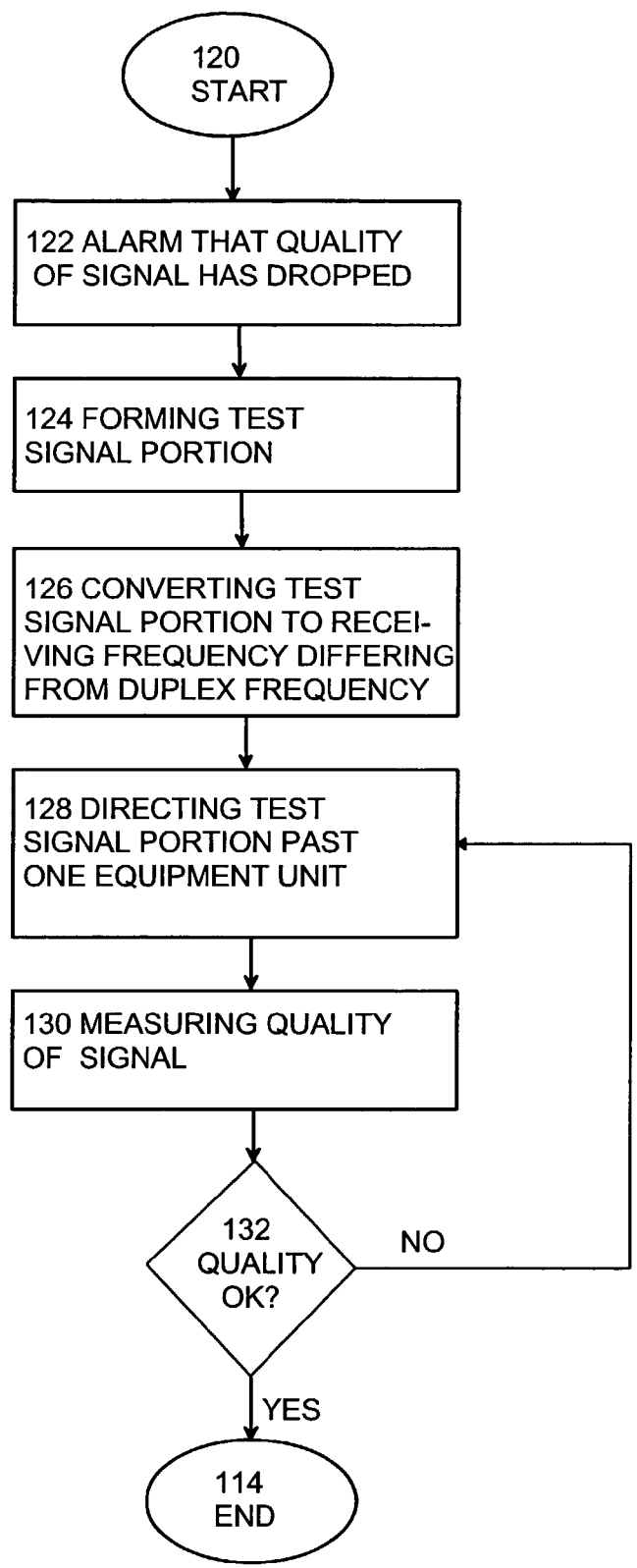
Figure 2:
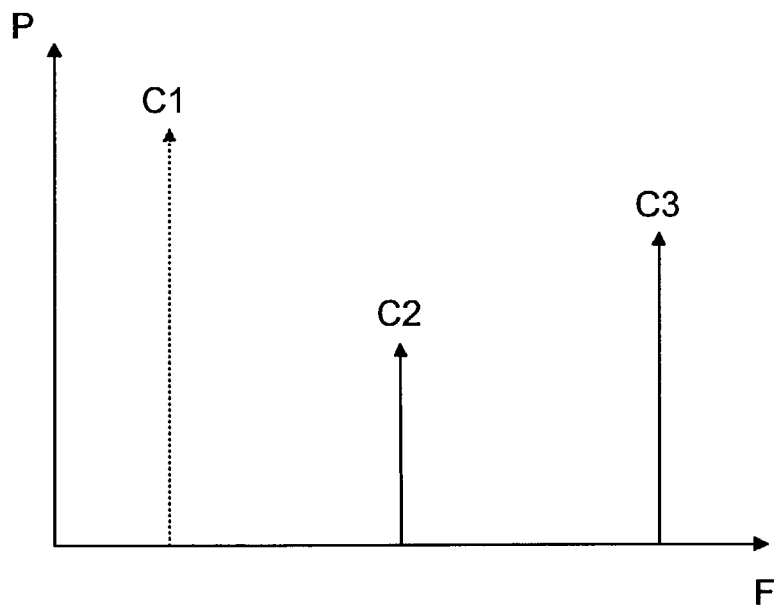
Figure 3:
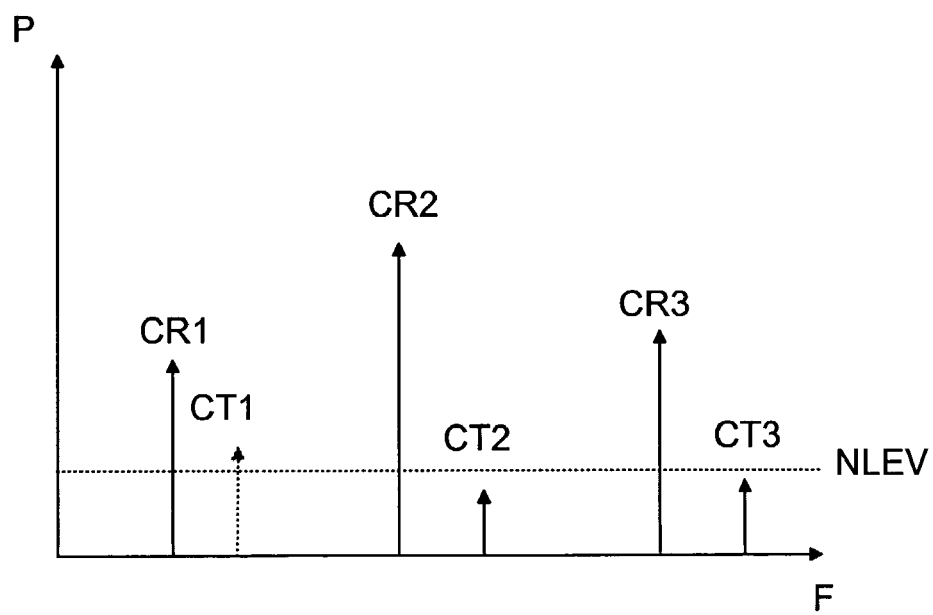
Figure 4:
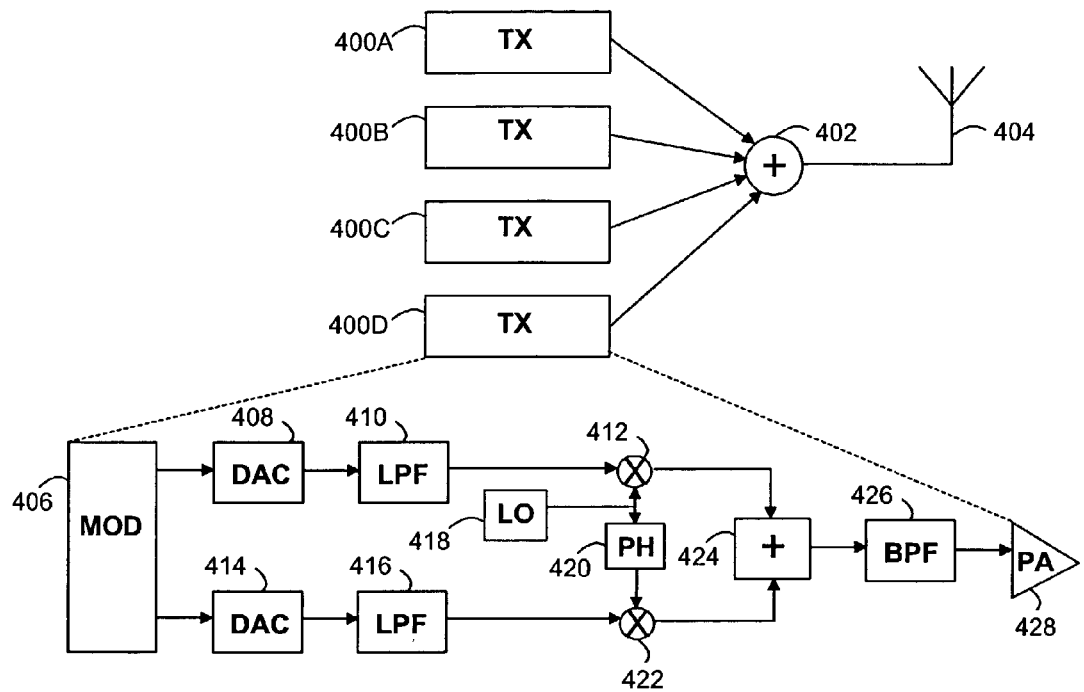
Figure 5:
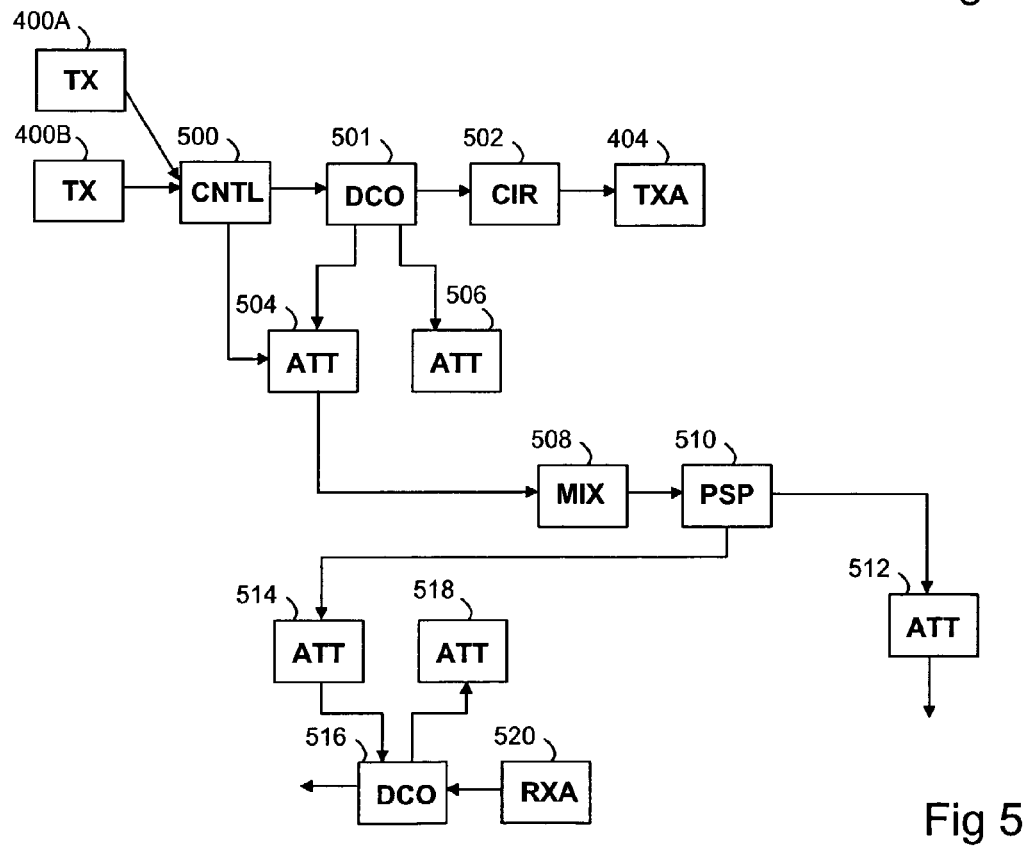
Figure 6:
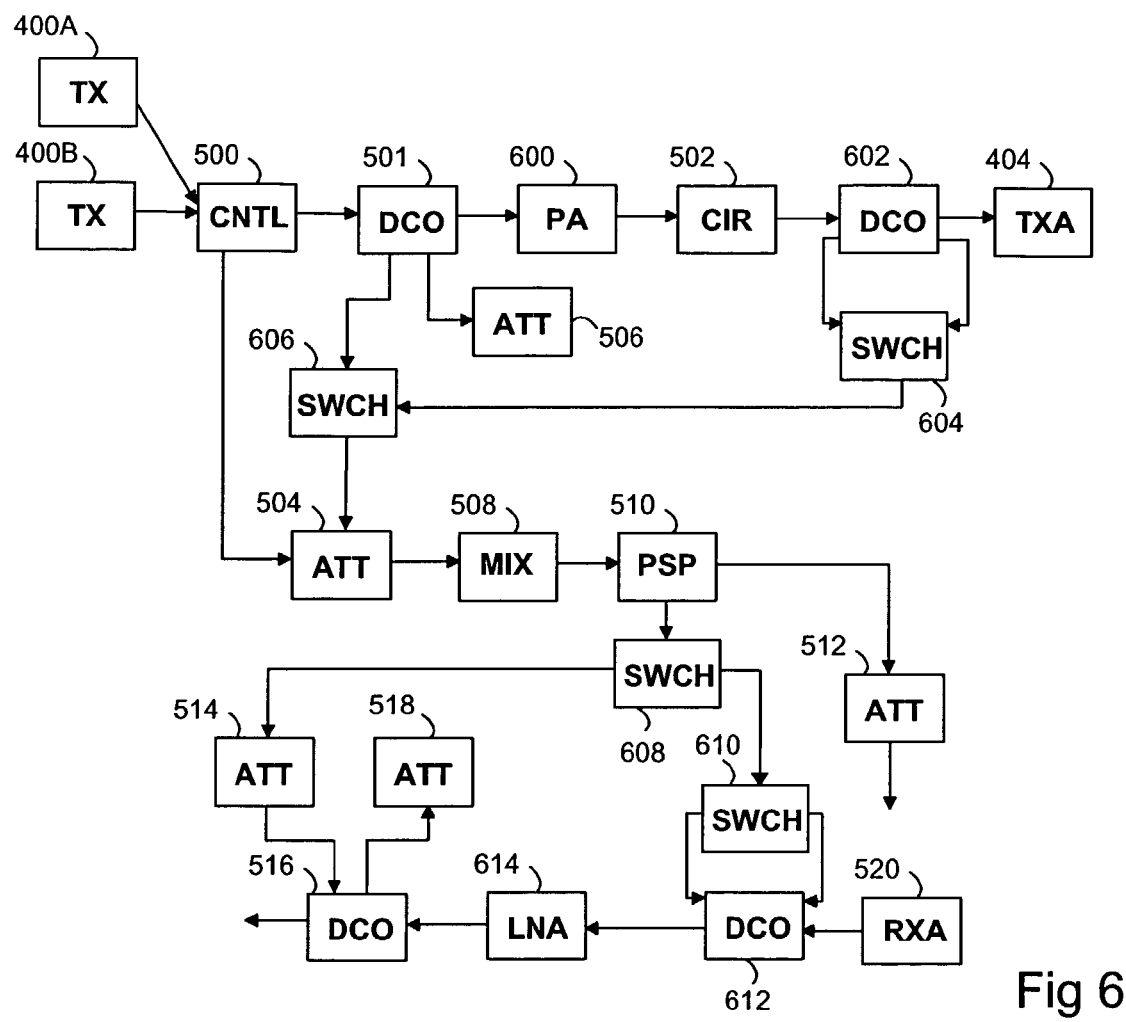

In the following, the invention will be described in greater detail with reference to the preferred embodiments and the accompanying drawings, where FIG. 1A shows one embodiment of a method according to the invention, FIG. 1B shows another embodiment of a method according to the invention, FIG. 2 illustrates transmission channels in one embodiment of the invention, FIG. 3 illustrates receiving channels in one embodiment of the invention, FIG. 4 illustrates one embodiment of a multi-carrier base station, FIG. 5 illustrates one embodiment of a base station according to the invention, and FIG. 6 illustrates another embodiment of a base station according to the invention.

DESCRIPTION OF THE EMBODIMENTS

FIG. 1 shows an example of the method according to the invention. Method step 102 shows the measuring of transmission powers in traffic signals in a base station. This is clarified by FIG. 2 where three traffic signals C1, C2, C3 are illustrated showing the transmission power P in function of the frequency F. In a GSM system, frequencies can be allocated for instance having a distance of 600 kHz between the channels, and the frequencies of these channels can be for instance C1=935.2 MHz, C2=935.8 MHz and C3=936.4 MHz. The traffic frequencies can also be allocated e.g. having a 200 kHz distance with each other, thus obeying the fixed frequency distribution scheme of the GSM system. In a TDMA system such as the GSM, user traffic signals C1 to C3 represent signals transmitted at the same time and thus in corresponding timeslots on different frequencies. The dashed signal C1 has the highest transmission power and can be selected according to step 104 to be the signal used for controlling of the functionality test in the base station.

In method step 106 in FIG. 1, a portion of the selected user signal is extracted to form a test signal portion. This can be done without filtering so that a part of the whole transmission band is extracted. The extracted signal portion is converted in the method step 108 onto a receiving frequency, which in practice can mean transforming the transmission frequency band onto a receiving frequency band. FIG. 3 shows the receiving frequencies, where channels CR1 to CR3 represent the duplex-separated receiving traffic channels corresponding to the transmission channels C1 to C3. Then for instance when the downlink channel C1 has the frequency 935.2, the receiving frequency CR1 is placed the duplex separation of 45 MHz apart from C1, which is 890.2 MHz. Correspondingly, receiving channels CR2 and CR3 are duplex-separated from the respective transmission channels C2 and C3.

In the method step 108, the extracted signal portion is converted onto a receiving frequency, which can be for instance 200 kHz shifted from the receiving traffic channel. The test signal CT1 can for instance be 200 KHz separated from the receiving frequency CR1 and correspondingly test signals CT2 and CT3 are 200 kHz separated from the corresponding traffic channels CR2 and CR3. During the functionality testing, the test signal portion is so attenuated, that the power ratio between the test signal and the corresponding traffic signal is at least 9 dB, as is the power difference in FIG. 3 between CT1 and CR3. The other test signals CT2 and CT3 received through the loop are then at a lower power level than the test signal CT1 and are under the noise level NLEV shown in FIG. 3. The transmission traffic channels can also be allocated on the neighbouring carrier frequencies spaced 200 kHz from each other, for instance. In this case, the test signal portion is shifted to a receiving frequency space, where are no traffic signals allocated. For instance, if the three transmission traffic frequencies are on frequencies from 935.0 to 935.4 MHz, the corresponding duplex receiving frequencies are 890.0 to 890.4. Then, the test signal portion can be converted to receiving frequencies 890.6 to 891.0, for instance.

The GSM standard requires that the performance of the receiver should not degrade when the adjacent channel at 200 kHz offset is at a +9 dB higher level and the adjacent channel at 400 kHz offset is at a +41 higher level. Since the multi-carrier base station typically allocates the traffic channels at least 600 kHz apart from each other, channels in between the traffic channels can be used for testing purposes as long as the mentioned critical values are not exceeded. This kind of accuracy can be achieved in the test loop because the base station transmitter is aware of the transmission power level of each channel and the received power level can be accurately predicted.

In method step 110, the converted signal portion is received in the receiver on one or several frequencies. In step 112, the received signal portion can be for instance measured, compared to the transmitted one or some other actions can be performed to the signal portion. For instance, in the case of a comparison, a bit-error-rate can be calculated on the basis of the comparison and the condition of the transceiver can be evaluated. For instance, if a predetermined threshold for the bit-error-rate is exceeded, an alarm can be given. Between the transmission and reception in the GSM system, for instance, there is a delay of three timeslots. That means, when a signal is transmitted in a certain timeslot, the corresponding receiving signal is placed in a timeslot, which comes three timeslots later in time than the transmission timeslot. In one embodiment, the base station places the receiving signal to its place based on an estimated power level of the receiving signal. That means, when the BTS knows the transmission power levels of mobile stations (MS), the receiving power levels can be estimated. Then, the BTS transmission frequency having the highest power level can be shifted to be next to the lowest BTS receiving power level.

The method illustrated in FIG. 1A shows the implementation of the method at one point of time. During a longer test period or during a continuous test, it has to be determined how the transmission signal frequency or receiving signal frequency are changed when the power levels in signals change. The transmission frequency, for instance, can be maintained until the power level of the transmission frequency drops more than a predetermined threshold determines. The usage of this kind of threshold can be justified in order to avoid the situation, where the transmission frequency subject to testing would have to be changed too often.

FIG. 1B shows another example of a functionality test in a base station. Step 122 shows that an alarm indicating a decreased quality level has been received. The quality can be based for instance on bit-error-rate measurements in the base station. Following the alarm, the base station starts a functionality test to determine the cause of the decreased quality level. In step 124, a test signal portion is created. The test signal portion can be created in a separate test tone generator or can be extracted from the traffic signal band to be transmitted by the base station. In step 126, the test signal portion is converted to a receiving frequency band where the frequency separation between the transmission frequency band and the receiving frequency band differs from the frequency duplex used in the radio system.

The functionality test presented in FIG. 1B is based on a unit-wise testing of the transmitter/receiver equipment. The unit-wise testing starts in step 128 where the test signal portion is directed so that it traverses past one equipment unit. The equipment unit, around which the test signal portion goes, can be for instance a receiving antenna or LNA (Low Noise Amplifier) in the receiver or a power amplifier or a transmitting antenna in the transmitter. For instance, if the receiving antenna has been tested in step 128 by directing the test signal past the antenna, the quality of the receiving signal is measured in step 130. If the quality improves when the receiving antenna is not part of the test chain, it can be concluded that the problem is in the receiving antenna and the testing can be finished as shown by the yes-branch in step 132. If however, the quality of the test signal did not improve by going around the receiving antenna, the testing has to be continued by going back to step 128 by selecting the no-branch in step 132 and directing the test signal to some other equipment unit in the transmitter or the receiver.

Due to the frequency-shifting step 126, the functionality test illustrated by FIG. 1B does not disturb the normal traffic operation of the base station. In FIG. 1B it should be noted that steps 126 and 128 can change their order with each other if the transmitter is tested. Then, the test signal portion is directed through the transmitter before the frequency shifting operation onto the receiving frequency is performed.

The arrangement according to the invention is now explained with reference to the embodiments shown in FIGS. 4 and 5. In FIG. 4, an embodiment of a multi-carrier base station is shown. The base station comprises several transmitters 400A to 400D, each of which is able to provide a signal transmitted along one carrier frequency. The signals created in transmitters 400A to 400D are summed in a summing element 402 and the created multi-frequency signal is transported to the transmitting antenna 404.

The operation of one transmitter 400D is explained with reference to equipment parts 406 to 428. The transmitter 400D has a data modulator 406, which branches the data into I- and Q-branches. Data is digital-to-analog converted in converters 408, 414 and filtered in low-pass-filters 410, 416. A local oscillator 418 produces a radio frequency signal, and the first data branch is multiplied in multiplier 412. The oscillated signal is phase-shifted 90 degrees in phase shifter 420 and multiplied in multiplier 422 with the second data branch. The produced radio frequency signals are added in adder 424 and further filtered in band-pass filter 426. The filtered signal is amplified in power amplifier 428 before transmission to a radio path.

FIG. 5 shows one embodiment of the arrangement according to the invention. The equipment units shown in FIG. 5 can belong to a multi-carrier GSM base station, for instance. The features of the invention are situated in between the transmitters 400A to 400B and the antenna 404 shown also in FIG. 4. The transmitters 400A to 400B are followed by a controlling means 500, which controls the loop test. The controlling means receives by signalling from a base station controller, for instance, the power level of the highest signal component in the transmission band. The controlling means utilizes this information in determining the appropriate attenuation of the transmission band and correct frequency shift during the conversion to the receiving frequency band.

During the loop test, the transmission power levels of the transmission band are determined continuously. in the OMU (Operation and Maintenance Unit), for instance, which signals this information to the controlling means 500. When the power levels of the transmission signals change in time, the controlling means also has to control which traffic signal the functionality test is based on. In one embodiment, the controlling means sets a threshold value for the change in transmission power level when it shall consider using another transmission frequency as a basis for the functionality test. Besides the change in power level, the threshold can also be based on the relative strengths of transmission frequencies or some other similar parameter. In one embodiment, the controlling means estimates the levels of the received frequencies, and places the transmission signal with the highest power level next to the reception signal with the lowest power level. In practise, the power levels of different carriers can change between timeslots and thus the transmission signal being subject to the loop test can belong to a different carrier for each timeslot. This provides the advantage that all frequencies transmitted by the base station will become tested.

The extracting means 501, which can be for example a directional coupler, will extract a signal portion from the transmission band. When the directional coupler 501 takes a portion of the signals, the transmitted signals are attenuated about 0.1 dB, for instance. From the directional coupler 501, the traffic signals are passed to a circulator/isolator 502, which directs the signals towards the transmission antenna 404. In FIG. 5, the functionality test signal is extracted from a traffic signal, but the test signal portion can also be generated in the base station.

The directional coupler 501 directs the test signal portion to the attenuating means 504 and 506. The attenuating means 504 can be for example a tunable attenuator 504, which attenuates the signal onto such a power level that does not disturb the actual traffic channels. For performing the attenuation, the attenuator 504 receives control information from the controlling means 500. The test signal portion has to be attenuated to such a power level that the power difference between the received test signal portion and the traffic signal does not exceed +/−9 dB.

The attenuator 506 can be a matched load for terminating the unused signal port of the directional coupler 501. The attenuated signal is transported to a frequency shifting means 508, such as a mixer, which converts the signal portion from the transmission frequency band to the reception band. In the invention, the shifting means uses a frequency shift, which differs from the duplex separation of the frequency bands. In the GSM system, the frequency shift can be for example 45.2 or 44.8 MHz instead of the duplex separation 45 MHz. From the frequency shifting, the shifted signal can be diversified by the power separator 510 onto diversity branches via the attenuator 512, if diversity reception is used in the base station. On the main branch, the signal is directed via an attenuator 514 to the receiver parts in the base station. The attenuator 518 is a matched load for terminating the unused signal port of the directional coupler 516. From thereon, the signal portion subject to the functionality test is handled in the receiver in the same way as signals received via the receiving antenna 520.

FIG. 6 shows one other arrangement relating to a functionality test of a base station. The functionality test can be a periodical test or it can follow an alarm in the base station. The periodical test can be based on a BER measurement, which shows that there is some malfunction in the base station. The base station thus contains means for measuring a value of a quality parameter and means for comparing the measured value to a predetermined threshold value. The equipment units already shown in FIG. 5 are not described again in conjunction with FIG. 6 but reference is made to FIG. 5.

FIG. 6 shows means for transporting the test signal portion in the base station. The transporting means can be a number of switches 604, 606, 608, 610, which can choose one of the input signals to an output signal or alternatively choose one of several output signals as response to an input signal. The idea in introducing directional couplers 501, 602, 612 and switches is that the test signal can be directed in the transmitter/receiver in various ways. A first test case can be constructed so that the test signal traverses the route 501-606-608-514, when a similar operation as in FIG. 5 is obtained. This first test case can indicate if there are problems in the receiver chain from directional coupler 516 onwards.

If the first test case indicates that the quality of the received signal is good, the problem has to reside either in the transmission chain 600-404 or the receiver chain 520-614. Then, a test case for the receiving antenna can be constructed. In this test case, the test signal portion is set to traverse the whole transmission and the receiving chain to the receiving antenna. If the antenna is faulty, the signal is reflected back and if the antenna is in order, the signal is not reflected. The test signal route can be 501-606-610 left branch-612, for instance. In this case, the test signal portion goes towards the reception antenna and if the problem is in the reception antenna, it can be identified. Next, if the reception antenna has been found to be in order, the amplifier 614 can be tested by guiding the signal along the route 501-608-610 right branch, for instance. The test signal portion can then be directed 501-606-608-514 in order to pass the amplifier 614. These two test cases, going through the amplifier and passing the amplifier, can be compared in order to find out if the amplifier is the cause to the BER-deterioration. That is, if the BER-value is higher when going through the amplifier than when passing it, it can be concluded that the fault is in the amplifier. In a similar manner, the repeating means of the base station can repeat test cases and direct them to the transmission antenna 404 and the power amplifier 600 in the transmission chain. When testing the transmission antenna 404, the test signal portion is directed towards the antenna 404. A small portion of the signal takes the right branch from DCO 602 but this is not essential to the test case. If there is reflection from the antenna, this goes partly to the left branch after DCO 602 and can be later on measured in the receiver. The described iterative steps shall be repeated as many times as necessary to find the cause to problems in the base station. When the faulty equipment unit has been found, the information is signalled to the OMU, for instance.

Although FIG. 6 refers to equipment unit as being an antenna or an amplifier, the equipment unit can also be a part of these units or some other unit used in the transceiver. In other words, the presented idea is not limited to the level of detail presented in FIG. 6.

The invention can be implemented as software in a base station. Alternatively, the invention can be implemented as ASIC (Application Specific Integrated Circuit) or as logic components.

Even though the invention is described above with reference to examples according to the accompanying drawings, it is clear that the invention is not restricted thereto but it can be modified in several ways within the scope of the appended claims.

The invention claimed is:

1. A functionality test method in a base station of a radio system, the method comprising:
   forming, in a transmitter of a base station, a test signal portion on at least one transmission traffic frequency included in a transmission signal band containing several traffic frequencies;
   shifting the formed test signal portion onto at least one receiving traffic frequency included in a receiving frequency band containing several traffic frequencies, the transmission traffic frequency being different from the receiving traffic frequency, where a separation between the receiving frequency and the transmission frequency differs from a frequency duplex used in the radio system, and
   transporting the frequency-shifted test signal portion to a receiver of the base station.

2. The method of claim 1, further comprising:
   attenuating the test signal portion so that a power level of the test signal portion is under a predetermined threshold in comparison to a power level on the receiving frequency band.

3. The method of claim 2, wherein the test signal portion is attenuated into a power level under a predetermined threshold value of power ratio where a power ratio is determined in the receiving signal band between a signal corresponding to the transmission signal having the highest power level and a neighbouring receiving frequency.

4. The method of claim 1, wherein the test signal portion is formed from a transmission signal frequency having a highest power level.

5. The method of claim 4, wherein the transmission frequency used for forming the test signal portion is changed when a predetermined threshold for the change in power level of the transmission frequency has been exceeded.

6. The method of claim 1, wherein, in the radio system, frequencies are situated at a first fixed-frequency distance from each other, and traffic frequencies are allocated at a second fixed-frequency distance from each other, where the second frequency distance is a multiple of the first frequency distance.

7. The method of claim 1, wherein the receiving frequency is selected to be a frequency having no allocated traffic.

8. The method of claim 1, wherein the base station is a multi-carrier base station.

9. The method of claim 1, wherein the functionality test is performed during traffic operation of the base station.

10. The method of claim 1, further comprising:
    measuring a value of a quality parameter indicating quality of the received signal;
    comparing the measured value of the quality parameter to a predetermined threshold value of the quality parameter;
    transporting a test signal portion towards a transmission or receiving antenna;
    measuring reflection of the test signal portion from the antenna.

11. The method of claim 10, further comprising:
    giving an alarm of the transmission or receiving antenna if the reflection of the test signal portion from the antenna exceeds a predetermined threshold.

12. The method of claim 1, wherein the radio system uses, as an access method, time division multiple access.

13. The method of claim 12,
    wherein the test signal portion is extracted from a traffic signal band, the method further comprising:

determining, in the transmitter, a frequency having a highest power level;
estimating, in the receiver, a frequency having the lowest receiving power level, and
in shifting the test signal portion onto a receiving frequency, shifting a transmission frequency having the highest power level next to the receiving frequency with the lowest estimated power level.

14. The method of claim 12, wherein, in the radio system, traffic channels are situated 200 kHz apart from each other, and the traffic channels are allocated 600 kHz apart from each other in a cell of the radio system, and the receiving frequency is allocated between two traffic frequencies 600 kHz apart from each other.

15. The method of claim 1,
wherein the test signal portion is extracted from a traffic signal band, the method further comprising:
delaying the test signal portion by a system defined delay, which defines the delay between a transmission and a reception for a user, whereby receiving the test signal portion is received in the receiver at the same time as the receiving traffic signal band.

16. The method of claim 1, wherein the functionality test is performed continuously.

17. A functionality test method in a base station of a radio system, the method comprising:
forming, in a transmitter of a base station, a test signal portion on at least one transmission frequency;
shifting the formed test signal portion onto at least one receiving frequency, where a separation between the receiving frequency and the transmission frequency differs from a frequency duplex used in the radio system,
transporting the frequency-shifted test signal portion to a receiver of the base station,
measuring a value of a quality parameter indicating quality of the received signal;
comparing the measured value of the quality parameter with a predetermined threshold value of the quality parameter;
transporting a test signal portion through equipment units in the transmitter and the receiver, and bypassing one or more equipment units in the transmitter or the receiver, if the value of the quality parameter is under the predetermined threshold value; and
repeating the transporting of the test signal portion by altering the one or more equipment unit that are bypassed until the value of the quality parameter exceeds the predetermined threshold value.

18. The method of claim 17, further comprising:
giving an alarm of the equipment unit, bypassing of which results in exceeding of the threshold value of the quality parameter.

19. A base station in a radio system, comprising:
at least one transmitter for forming a signal to be transmitted by a transmission antenna of the base station;
means for forming a test signal portion of at least one signal formed by the at least one transmitter to be transmitted on a transmission traffic frequency included in a transmission signal band containing several traffic frequencies;
means for shifting the formed test signal portion onto at least one receiving traffic frequency included in a receiving frequency band containing several traffic frequencies, the transmission traffic frequency being different from the receiving traffic frequency, where the separation between the receiving frequency and the transmission frequency differs from the frequency duplex used in the radio system, and
means for receiving the frequency-shifted test signal portion.

20. The base station of claim 19, wherein the base station comprises means for attenuating the test signal portion by determining an appropriate attenuation level using a power level of the receiving signal band.

21. The base station of claim 20, wherein the attenuating means is arranged to attenuate the test signal portion onto a power level under a predetermined threshold value of power ratio in the receiving signal band between a signal corresponding to the transmission signal having a highest power level and a neighbouring receiving frequency.

22. The base station of claim 19, comprising:
means for controlling a functionality test, and in which base station the controlling means is arranged to control the functionality test by using the traffic signal frequency having the highest power level.

23. The base station of claim 22, wherein the controlling means is arranged to:
change a transmission frequency used for the functionality test when a predetermined threshold for the change in power level of the selected transmission frequency has been exceeded.

24. The base station of claim 19, wherein, in the radio system, carrier frequencies are situated at a first fixed-frequency distance from each other, and traffic frequencies are allocated at a second fixed-frequency distance from each other, where the second frequency distance is a multiple of the first frequency distance.

25. The base station of claim 19, wherein the shifting means is arranged to select a receiving frequency that has no allocated traffic.

26. The base station of claim 19, wherein the base station is a multi-carrier base station.

27. The base station of claim 19, further comprising:
means for measuring a value of a quality parameter indicating quality of the received signal;
means for comparing the measured value of the quality parameter to a predetermined threshold value of the quality parameter;
means for transporting a test signal portion towards a transmission or receiving antenna;
means for measuring reflection of the test signal portion from the antenna.

28. The base station of claim 27, comprising:
means for giving an alarm of the transmission or receiving antenna if the test signal portion is reflected from the antenna being tested.

29. The base station of claim 19, wherein the radio system uses, as an access method, time division multiple access.

30. The base station of claim 29, wherein the forming means is arranged to form a test signal portion by extracting a signal portion from a traffic signal band, the base station further comprising:
means for delaying the test signal portion by a system defined delay, which defines a delay between a transmission and a reception for a user, whereby the test signal portion is received in the receiver at the same time as the receiving traffic signal band is received.

31. The base station of claim 29, wherein forming means is arranged to form a test signal portion by extracting a signal portion from traffic signal band, the base station further comprising:
means for determining in the transmitter the frequency having the highest power level;

means for estimating in the receiver the frequency having the lowest receiving power level, and the shifting means is arranged to shift a transmission frequency with a highest power level next to a receiving frequency having a lowest estimated power level.

32. The base station of claim 29, wherein, in the radio system, traffic channels are situated 200 kHz apart from each other, and the traffic channels are allocated 600 kHz apart from each other in a cell of the radio system, and the receiving frequency is allocated between two traffic frequencies 600 kHz apart from each other.

33. A base station in a radio system, comprising:
at least one transmitter for forming a signal to be transmitted by a transmission antenna of the base station;
means for forming a test signal portion of at least one signal formed by the at least one transmitter to be transmitted on a transmission frequency;
means for shifting the formed test signal portion onto at least one receiving frequency, where a separation between a receiving frequency and a transmission frequency differs from a frequency duplex used in the radio system,
means for receiving the frequency-shifted test signal portion;
means for measuring a value of a quality parameter indicating quality of a received signal;
means for comparing the measured value of the quality parameter with a predetermined threshold value of the quality parameter;
means for transporting a test signal portion through equipment units in the transmitter and the receiver, and bypassing one or more equipment units in the transmitter or the receiver, if the value of the quality parameter is under the predetermined threshold value; and
means for repeating the transporting of the test signal portion by altering the one or more equipment units, which are bypassed until the value of the quality parameter exceeds the predetermined threshold value.

34. The base station of claim 33, comprising:
means for giving an alarm of the equipment unit, passing of which results in exceeding of the threshold value of the quality parameter.

35. An article of manufacture for testing functionality in a base station of a radio system, the article of manufacture comprising a machine readable medium containing one or more programs which when executed implement the steps of:
forming, in a transmitter of a base station, a test signal portion on at least one transmission traffic frequency included in a transmission signal band containing several traffic frequencies;
shifting the formed test signal portion onto at least one receiving traffic frequency, included in a receiving frequency band containing several traffic frequencies, the transmission traffic frequency being different from the receiving traffic frequency, where a separation between the receiving frequency and a transmission frequency differs from a frequency duplex used in the radio system, and
transporting the frequency-shifted test signal portion to a receiver of the base station.

* * * * *